T. SPACIE.
DRIVING AND STEERING DEVICE FOR MOTOR VEHICLES.
APPLICATION FILED NOV. 6, 1913.
1,188,854.
Patented June 27, 1916.
2 SHEETS—SHEET 1.
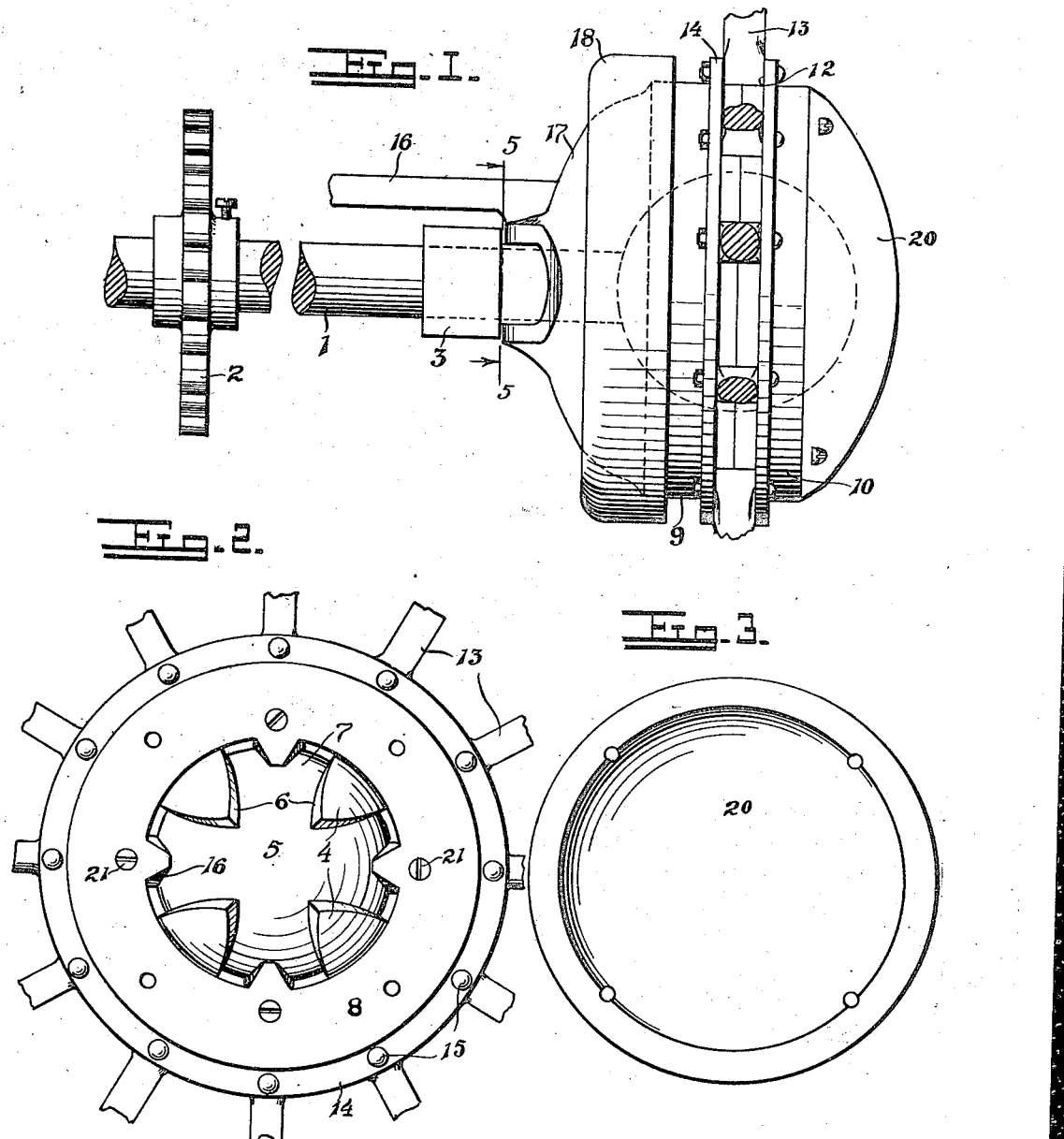

T. SPACIE.
DRIVING AND STEERING DEVICE FOR MOTOR VEHICLES.
APPLICATION FILED NOV. 6, 1913.
1,188,854.
Patented June 27, 1916.
2 SHEETS—SHEET 2.
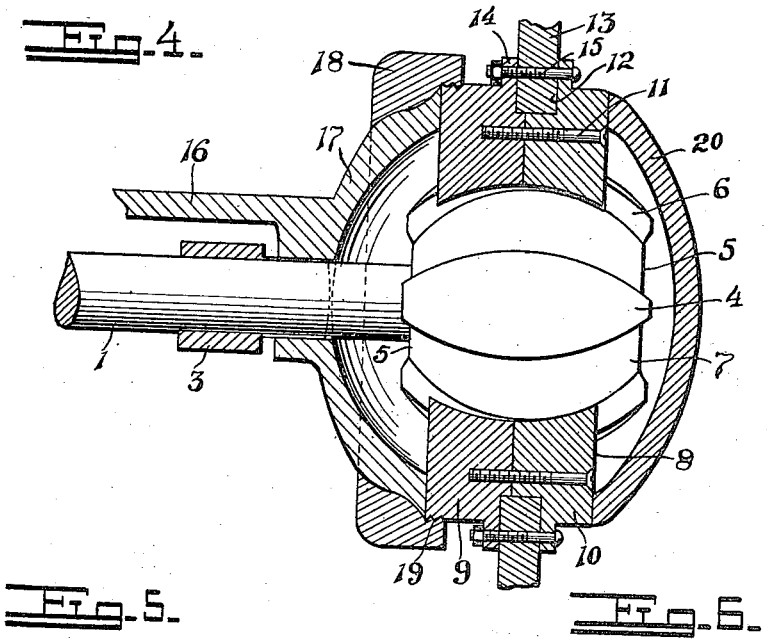
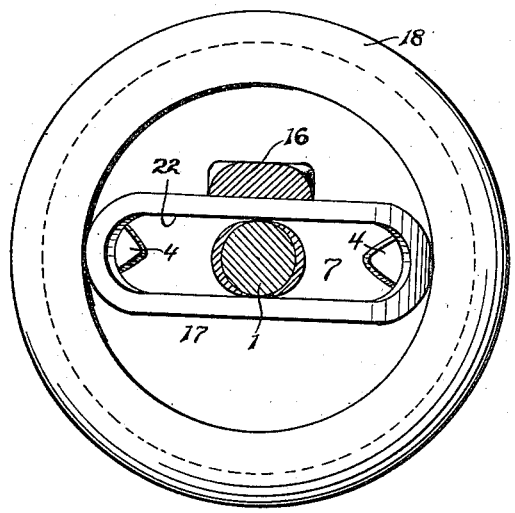
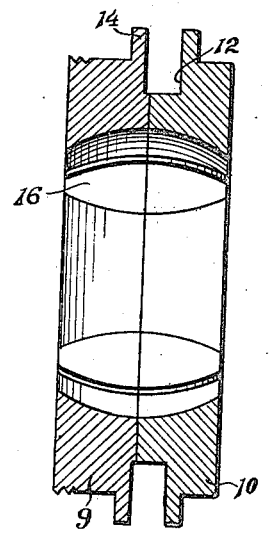
Witnesses
Inventor
Thomas Spacie,
By
his Attorney

UNITED STATES PATENT OFFICE.

THOMAS SPACIE, OF BLUE ISLAND, ILLINOIS.

DRIVING AND STEERING DEVICE FOR MOTOR-VEHICLES.

1,188,854.   Specification of Letters Patent.   Patented June 27, 1916.

Application filed November 6, 1913. Serial No. 799,594.

*To all whom it may concern:*

Be it known that I, THOMAS SPACIE, citizen of the United States, residing at Blue Island, in the county of Cook and State of Illinois, have invented certain new and useful Improvements in Driving and Steering Devices for Motor-Vehicles, of which the following is a specification.

This invention relates to improvements in a driving and steering device or mechanism for motor vehicles.

The object of the invention is to provide a new and improved driving and steering device for motor vehicles, so arranged thereupon as to permit driving the vehicle or turning the same into any angular position for steering purposes, the device being simple and durable in construction, easily manipulated, and arranged to effectively transmit the power and reduce the friction to a minimum.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1 is a side elevation, the axle being partly broken away, illustrating the mechanism comprising the present invention; Fig. 2 is an end view with the cap removed; Fig. 3 is an elevation of the cap; Fig. 4 is a longitudinal sectional view of the mechanism illustrated in Fig. 1; Fig. 5 is a section on the line 5—5 of Fig. 1; and Fig. 6 is a longitudinal sectional view of the socket plate.

Before proceeding with the description of the drawings, I desire to call particular attention to the fact that while I have evolved my invention with particular reference to its application in connection with motor vehicles, the same may be readily utilized as a driving and steering device for marine vessels, traction engines, flying machines and various other vehicles of the self-propelled type.

Referring now to the drawings wherein is illustrated the preferred embodiment of my invention the numeral 1 designates the front axle of the motor vehicle in connection with which the present invention is employed, the said axle having associated therewith a driving gear 2, whereby motion is imparted thereto. A bearing 3 of any suitable construction is provided for the said axle 1.

Formed integrally with the axle 1 or fixedly secured thereto, I provide a ball member designated as an entirety by the numeral 4, the ends of the ball being flattened as at 5, while the periphery is provided with a plurality of preferably four, integrally formed concavo-convex ridges or extensions 6, thereby providing grooves or recesses 7, the purpose of which will subsequently appear.

Arranged to embrace the ball member 4, and to partially inclose the same, I provide a socket member designated as an entirety by the numeral 8, the said member in its preferred embodiment comprising a pair of annular socket sections 9 and 10 respectively, the said two sections being detachably yet rigidly secured through the medium of screws or bolts 11 extending transversely therethrough. The meeting faces of each of the said sections is cut away as at 12 to provide an annular groove within which the spokes 13 are seated; annular flanges 14 being formed integrally with each of the said socket sections, the said flanges engaging the said spokes 13 to provide a securing element therefor when taken in connection with the screws 15 extending transversely therethrough and through the said spokes as is illustrated to advantage in Figs. 1, 2 and 4 of the drawings. Extensions or ridges 16 are formed integrally with and project from the inner periphery of the said socket member 8, the said extensions fitting one within each of the recesses 7 formed within the ball member 4, thereby effecting substantially a ball and socket connection for the wheels (not shown) supported by the spokes 13 forming a part thereof.

A casing is provided for the ball member 4, the said socket 8 forming a part thereof, which socket is supported or maintained in frictional engagement with an enlargement 17 of the steering arm, designated 16', the said enlargement forming a part of the said casing. A band or collar 18 is arranged to overlap, embrace and frictionally engage the enlargement 17, the said band being secured upon, as at 19, and carried by one of the socket sections 9, to provide for the maintenance of the same in engagement with the ball member 4 and in operative relation with the enlargement 17, the said band serving in the capacity of a support or connecting means for the said socket.

The inner periphery of the collar or band 18 is preferably shaped to conform to the configuration of a portion of the outer face of the enlargement or casing section 17, this being illustrated to advantage in Fig. 4 of the drawings. A cap 20 is detachably secured by means of screws or other means, 21 to the socket section 10, the said cap forming a casing section, which with the socket 8 and the enlargement 17 effects a housing or casing within which the ball member 4 is inclosed. The inner face of both the enlargement 17 and the cap 20 are concaved as shown. An elongated opening 22 is formed within the enlargement 17 through which the axle 1 of the vehicle extends, the provision of the opening 22 permitting the steering arm 16 to be swung at an angle to the axle and thus provide for the steering feature of the device.

Having described in detail the construction of the mechanism comprising the present invention, it now remains to set forth the operation thereof. Motion being transmitted to the axle 1 through the driving gear 2, it is apparent that the ball member 4 is rotated with the said axle. The ridges or extensions 16 of the socket member being fitted loosely within the recesses 7 of the ball member will transmit motion to the former during the rotation of the latter, and as the wheel is secured to the said socket member, the latter serving in the capacity of the hub therefor, it is apparent that power is transmitted to the said wheel. When it is desired that the said wheel should be swung at an angle to the axle 1, the steering arm 16′ is actuated, and, as the said arm is connected to the socket or hub 8, the latter is swung at an angle to the axle 10, the elongated opening 22 permitting such movement, thereby rotating the wheel at the angle desired.

From the above, taken in connection with the accompanying drawings, it will be seen that the ball member 4 is incapable of rotation independent of the socket 8; that the enlargement 17, socket 8 and cap member 20 provide a casing for the said ball member 4, thereby protecting the latter as well as providing a dust proof inclosure therefor; and that by the provision of the band or collar 18, a positive retaining element is provided whereby the socket 8 is maintained in frictional engagement with the enlargement 17, the said socket being rotatable independent thereof.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:

In steering and driving mechanism for vehicles, a driven axle, a substantially spherical exteriorly grooved head upon said axle, a wheel hub inclosing said head, the mentioned hub comprising a pair of connected hub sections, the respective sections each having a concentric opening formed therein, the openings being alined that the sections may jointly encircle said head, radial extensions formed interiorly of the connected sections to engage in the mentioned groove, a cap affixed to the outside section, a steering arm, an enlargement integral with the steering arm and abutting the inside section; the enlargement, the sections and the cap jointly affording a socket for said head, the mentioned enlargement being provided with an elongated opening through which the axle extends, a movable means threaded on the wheel hub and adapted for overlapping and frictional engagement with the enlargement to move the wheel bodily laterally therewith, the slot terminals limiting such movement, and means to drive said axle.

In testimony whereof I affix my signature in presence of two witnesses.

THOMAS SPACIE.

Witnesses:
 CHAS. A. NEBEL,
 H. G. KOUCH.

Copies of this patent may be obtained for five cents each, by addressing the "Commissioner of Patents, Washington, D. C."